(12) United States Patent
Kamatani

(10) Patent No.: US 6,339,568 B1
(45) Date of Patent: Jan. 15, 2002

(54) DATA RECORDING AND REPRODUCING TECHNIQUE FOR MULTI-LAYERED OPTICAL DISK SYSTEM USING DIFFERENT COMPRESSION TECHNIQUES

(76) Inventor: Yasuo Kamatani, 2-12-2 Yokoyama, Sagamihara-shi, Kanagawa 229-11 (JP)

( * ) Notice: Subject to any disclaimer, the term of this patent is extended or adjusted under 35 U.S.C. 154(b) by 0 days.

(21) Appl. No.: 09/670,890

(22) Filed: Sep. 28, 2000

Related U.S. Application Data

(62) Division of application No. 09/370,308, filed on Aug. 9, 1999, now Pat. No. 6,215,743, which is a continuation of application No. 08/720,531, filed on Sep. 30, 1996, now Pat. No. 5,982,723.

(51) Int. Cl.⁷ ................................................ G11B 5/09
(52) U.S. Cl. ............................ 369/47.15; 369/124.06
(58) Field of Search ............................. 369/32, 33, 94, 369/275.3, 133, 47.15, 47.23, 47.24, 47.16, 53.31, 53.37, 53.44, 53.45, 59.13, 59.14, 59.23, 59.24, 124.06, 47.55

(56) References Cited

U.S. PATENT DOCUMENTS 4,853,915 A * 8/1989 Takasago et al. ............. 369/32
5,010,539 A * 4/1991 Terashima et al. ........ 369/133 X
5,715,355 A * 2/1998 Yonemitsu et al. ..... 369/275.3 X

* cited by examiner

Primary Examiner—Paul W. Huber

(57) ABSTRACT

A data recording and reproducing method for an optical disk data storage system to record data compressed at different data compression rate according to an operator's specification, and to reproduce the recorded data by decompressing. According to the operator's indication, the data is recorded at certain data compression rate in indicated area. The information of the data compression rate and the recorded area is stored as a total of contents (TOC) data. The TOC data is reproduced and stored in a memory after the optical disk is loaded. The recorded data is reproduced by selecting a decoding circuit to decompress the data. The decoding circuit is selected by referring the TOC data to identify data compression rate of the recorded data. Also the TOC data is referred to identify read-in and read-out region of the recorded data. The position of a pick-up when the data recording is started and ended, is recorded as the TOC data to provide random access capability for the data reproduction.

61 Claims, 3 Drawing Sheets

DATA RECORDING AND REPRODUCING TECHNIQUE FOR MULTI-LAYERED OPTICAL DISK SYSTEM USING DIFFERENT COMPRESSION TECHNIQUES

This application is a divisional of prior Application Ser. No. 09/370,308, filed on Aug. 9, 1999, now U.S. Pat. No. 6,215,743, which is a continuation of Ser. No. 08/720,531, filed on Sep. 30, 1996, now U.S. Pat. No. 5,982,723.

BACKGROUND OF THE INVENTION

1. Field of the Invention

This invention relates to an optical data recording and reproducing method. More specifically, this invention relates to an optical disk recording and reproducing method which makes possible to record data encoded by different encoding circuit at different data compression rate and to reproduce the data.

2. Description of the Prior Art

Initialized by the vast increase in information that needs to be processed, optical data storage system have become very important system particularly because of their high storage density per area. Most of the recent optical information storage systems rotating single optical disk are used on which the information is digitally stored in concentric circular tracks in an ordered, predifined manner to allow chronological fast reading and fast random access to desired pits of data.

In order to accomplish even more storage capacity of optical disk systems for enormous information processing, such as video or picture communication like so called video-on-demand service, multiple disk systems have been proposed. An optical disk system equipped with two or more data layers may in theory be accessed at different disks by changing the focal point with moving lens. Example of this type of state-of-the-art include U.S. Pat. No. 5,202,875 issued Apr. 13, 1993 to Rosen, et al.; Japanese Published Application, 63-276732 published Nov. 15, 1988 by Watanabe, et al.

Such multiple disk recording and reading system is applied to varied optical disk information storage system. For example, a digital video disk (DVD) system for home entertaining is one of the typical application. The mentioned advantage of vast storage capacity may contribute especially for video signal transmission. In order to record the video data efficiently onto the optical disk, the video data compression technique must be one of the key technology. And the standardized video data compression rate is proposed, which is called MPEG (Moving Picture Experts Group). However, for the home entertaining purpose, more flexible function must be required. The ability to record data at different data compression rate and to reproduce the recorded data must be one of the function to be needed.

3. Summary of the Invention

The present invention has for its object to provide a multi-layered optical disk recording and reproducing system which is able to record data encoded by different encoding circuit at different data compression rate and to reproduce the data by selected decoding circuit.

The object of the present invention can be achieved by an optical data recording and reproducing method, the recording method comprising the steps of: loading a multi-layered optical disk which has M data layers (wherein M is an integer greater than 1), receiving operator's signal to record data on Nth data layer of the multi-layered optical disk at certain data compression rate (wherein N is an integer greater than 1 and not greater than M), operating a routing circuit to transmit the data to determined encoding circuit in order to compress the data at predetermined data compression rate, recording the data on predetermined position at predetermined data compression rate, and rewriting a total of contents (TOC) data to record data about data compression rate of the newly recorded data.

And the object of the present invention can be achieved by an optical data recording and reproducing method, the reproducing method comprising the steps of: loading a multi-layered optical disk which has M data layers (wherein M is an integer greater than 1), reproducing a total of contents (TOC) data recorded in the multi-layered optical disk, storing the reproduced TOC data in a memory, receiving operator's signal to reproduce selected data stored in the multi-layered optical disk, referring the TOC data stored in the memory to identify data compression rate of the selected data, and operating a routing circuit to transmit readout signal of the selected data to determined encoding circuit in order to decompress the selected data.

For a fuller understanding of the nature and advantages of the present invention reference should be made to the following detailed description taken in conjunction with the accompanying drawings.

4. Briedf Description of the Drawings

5. Detailed Description of the Preferred Embodiment

Embodiments of the present invention will be explained with reference to the drawings.

Figure 1:
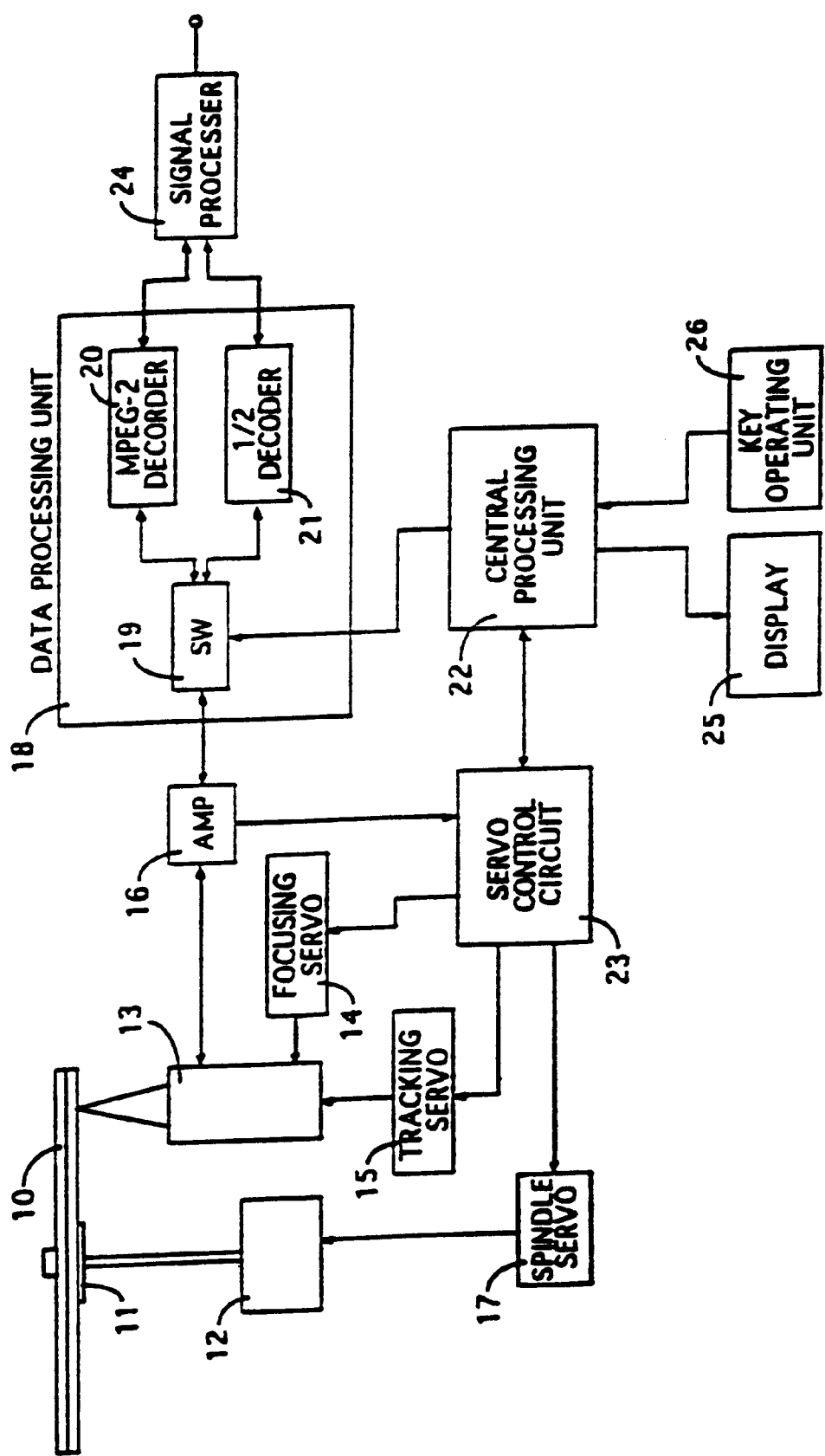
FIG. 1 shows a block diagram of an example of an optical data recording and reproducing apparatus to which the present invention can be applied.

FIG. 1 shows a block diagram of a first example of an optical data recording and reproducing apparatus to which the present invention can be applied. A digital video disk (DVD) 10 which has more than two data layers is mounted on and secured by a turntable 11 to be rotated by a spindle motor 12. Encoded pits on the DVD 10 is read by a pickup 13 which includes a laser diode, a focusing lens, a focusing lens actuator, a tracking actuator and a photo-detector. The movement of the pick-up 13 is controlled by a focusing servo circuit 14 and a tracking servo circuit 15.

To reproduce data encoded on the DVD 10, the output signal from the pickup 13 is transmitted to an amplifier 16. According to focusing error signal, the focusing servo circuit 14 modulates the focusing lens actuator to move focal point of the laser beam emitted from the laser diode by moving the focusing lens to access one of the data layer of the DVD 10. And according to tracking error signal, the tracking servo circuit 15 modulates the tracking actuator to control position of the pickup 13. The spindle servo circuit 17 modulates the spindle motor 12 in order to track linear velocity of the DVD 10.

The detected signal by the pick-up 13 is amplified by the amplifier 16. And the amplified signal is transmitted to a data processing unit 18 which is composed of a routing switch 19, an MPEG-2 decoder 20 and a ½ decoder 21. The MPEG-2 decoder 20 is standardized data encoding or decoding circuit for a Digital Video Disk (DVD), in order to encode data signal to record on the disk and to decode the read out signal for signal processing. The ½ decoder 21 is a data encoding or decoding circuit to encode and compress the applied data signal to half data rate of the standardized DVD format. Due to the data compression by the ½ decoder 21, the quality of the data must be sacrificed in order to record longer data per recording area. However, it makes possible to provide additional function and flexibility for the user. A set of TOC data encoded at read-in region of the DVD 10 must include the data of starting and ending position of each data portion and the data compression rate of each data. The TOC data is reproduced right after the DVD is loaded, then the each data reproduction is proceeded by referring the TOC data. And the TOC data must be rewritten after new data is recorded.

The routing switch 19 is operated by a central processing unit (CPU) 22 according to the detected TOC data which is including the data of compression rate of each data to determine appropriate decoding circuit. The TOC data is also transmitted to a servo control circuit 23 which modulates the focusing servo circuit 14, the tracking servo circuit 15 and the spindle servo circuit 17. The servo control circuit 23 modulates each servo circuit to access to a selected data according to the TOC data which is including the data of starting and ending position of each encoded data portion. Then the decoded signal is transmitted to a signal processor 24 to transmit the reproduced data signal to any connected unit such as display system or sound system. The CPU 22 is operated by an operation signal from a key operating unit 26 which transmits all operating signal of an operator. The CPU 22 also controls a display unit 25 to show the data reproducing status to the operator.

To record data onto the DVD 10, a portion of input data signal is transmitted from the signal processor 24 to one of the chosen decoder in the data processing unit according to the operator's command. The input data signal is encoded by the selected decoder, then recorded by the pick-up 13 which is driven by the each servo circuit and the servo control circuit 23. After the new data is recorded on the DVD 10, the TOC data is rewritten to store the data of position and data compression rate of the newly recorded data.

In addition, by storing the data of read-in and readout position of the all recorded data as TOC data, the quick random access capability to any data portion is provided for the data reproduction process. For example, in order to reproduce one data and another data continuously, the pick-up head can access from readout region of the first data to read-in region of the second data rapidly if data of all read-in region's position is stored and recorded in the TOC data. In the prior art system, all of the read-in region of the data between first and second data must be counted by detecting the readout signal. For example, in order to reproduce 4th data and 14th data recorded on the disk, the pick-up must detect and count ten read-in regions of the data between 4th and 14th data by moving the pick-up all over the disk. The present invention can provide the advantage of reproducing the data continuously without timelag. The advantage may contribute remarkably for the multi-layered optical disk reading system which is equipped with more than two data layer.

Figure 2:
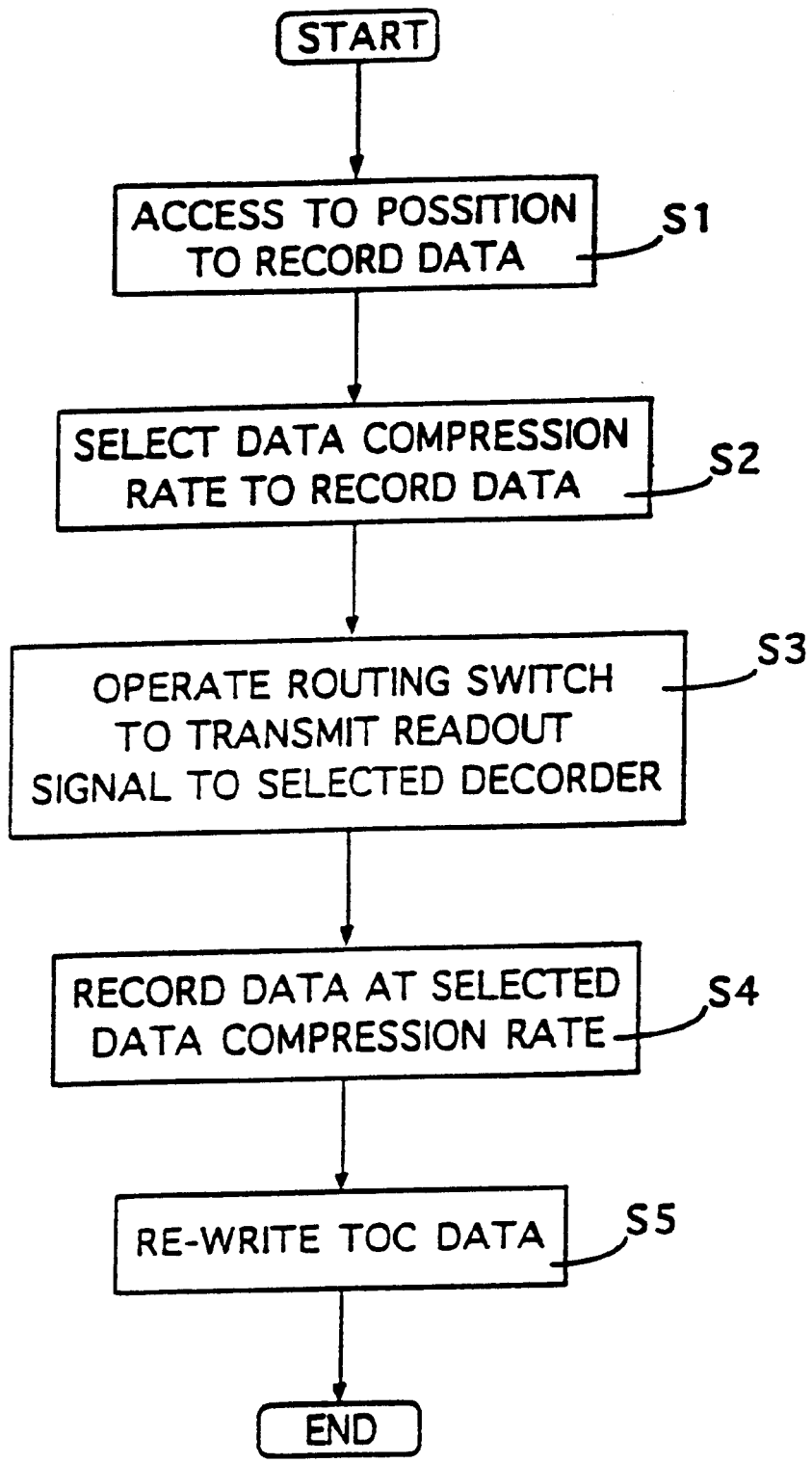
FIG. 2 shows a flowchart for a description of an optical disk recording method of the present invention.

FIG. 2 shows a flowchart of an operation processing in a central processing unit (CPU), while recording data onto one data layer of a multi-layered optical disk. After a multi-layered optical disk which has M data layers (wherein M is an integer greater than 1) is loaded, the CPU receives operator's signal to record data on Nth data layer of the multi-layered optical disk (wherein N is an integer greater than 1 and not greater than M). The CPU operates a servo control circuit to dispose a pick-up in order to access read-in region of the data to be recorded (Step 1:S1). According to the operator's decision on data compression rate (S2), the CPU operates a routing circuit to transmit the data to determined encoding circuit in order to compress the data at the selected data compression rate (S3). The CPU operates a servo control circuit to record the data on predetermined position at predetermined data compression rate (S4). After the data recording is completed, the CPU operates a servo control circuit to rewrite a total of contents (TOC) data to record data about data compression rate of the newly recorded data (S5).

Figure 3:
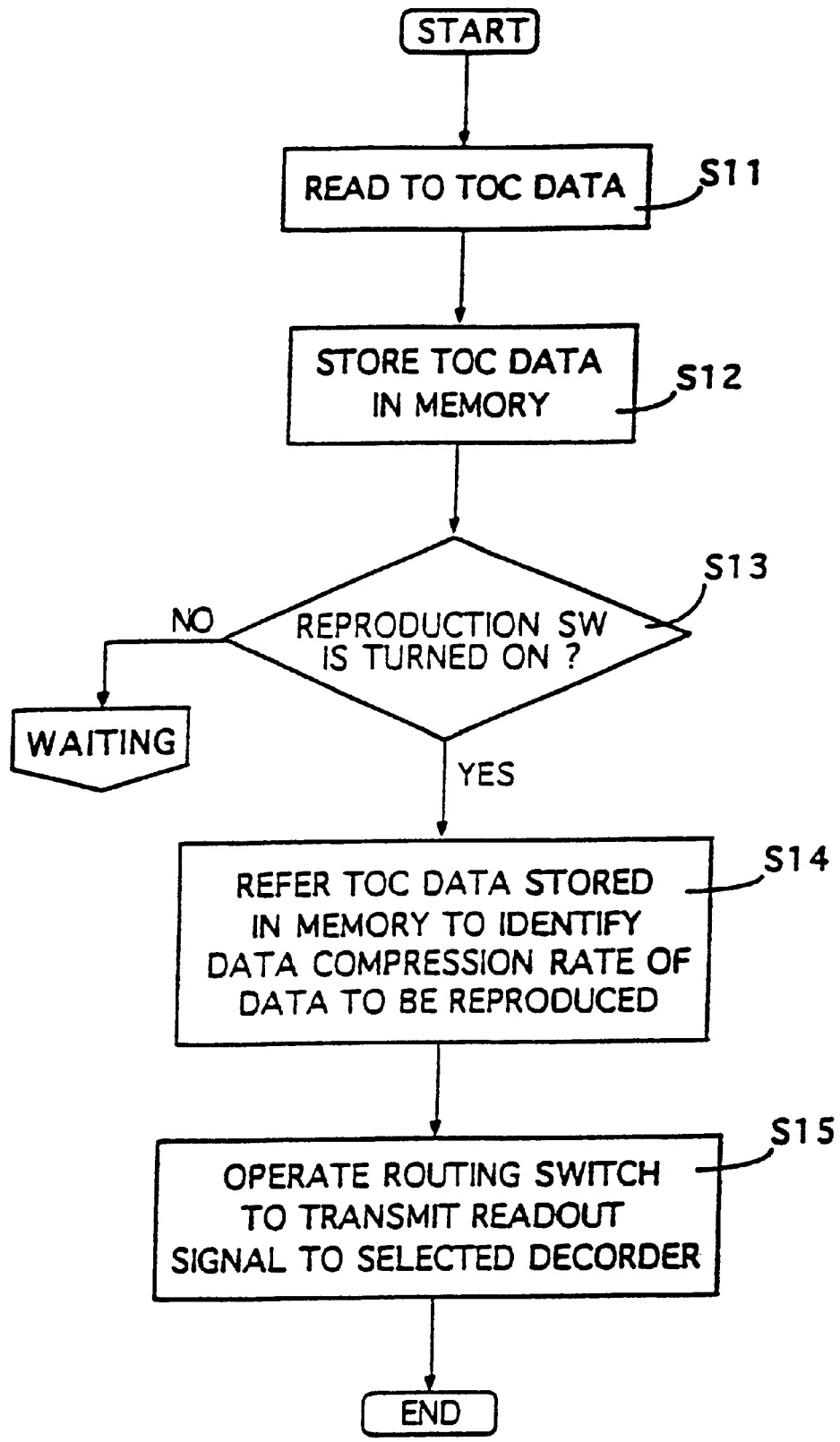
FIG. 3 shows a flowchart for a description of an optical disk reproducing method of the present invention.

FIG. 3 shows a flowchart of an operation processing in the CPU, while reproducing data which is recorded by the procedure described in FIG. 2. After a multi-layered optical disk which has M data layers (wherein M is an integer greater than 1) is loaded, the CPU operates the servo control circuit to reproduce a total of contents (TOC) data recorded in the multi-layered optical disk (S11). Then the CPU stores the reproduced TOC data in a memory (S12). When the CPU receives operator's signal to reproduce certain data from the optical disk (S13), the CPU refers the TOC data stored in the memory to identify data compression rate of the selected data (S14). Then the CPU operates the routing circuit to transmit readout signal of the selected data to determined encoding circuit in order to decompress the selected data (S15). After all of these procedures are completed, the data reproduction is started.

Although the invention has been particularly shown and described, it is contemplated that various changes and modification may be made without departing from the scope of the invention as set forth in the following claims.

What is claimed is:

1. A method usable with an optical disk, comprising:
designating a first region on the optical disk to store first data associated with a first compression technique;
designating a second region different from the first region on the optical disk to store second data associated with a second compression technique, the first compression technique being different from the second compression technique;
storing the first data in the first region;
storing the second data in the second region; and
storing indications of the first and second regions in a table of contents stored on the optical disk.

2. The method of claim 1, further comprising:
storing information on said optical disk indicating the first and second compression techniques.

3. The method of claim 1, wherein
the optical disk has multiple layers, and
the designating the first region comprises designating a location on one of the layers of the optical disk.

4. The method of claim 1, wherein
the optical disk has multiple layers, and
the designating the second region comprises designating a location on one of the layers of the optical disk.

5. The method of claim 1, wherein the optical disk comprises a DVD disk.

6. A method usable with an optical disk, comprising:
retrieving a first indication from the optical disk designating a first region associated with a first compression technique;
retrieving a second indication from the optical disk designating a second region associated with a second compression technique and being different from the first region second compression technique being different from the first compression technique;

retrieving first data from the first region using the first compression technique; and retrieving second data from the second region using the second compression technique wherein at least one of the first and second indications is retrieved from a table of contents stored on the optical disk.

7. The method of claim 6, further comprising:

retrieving information from said optical disk describing the first and second compression techniques.

8. The method of claim 6, wherein the optical disk has multiple layers, and the first indication designates a location on one of the layers of the optical disk.

9. The method of claim 6, wherein the optical disk has multiple layers, and the second indication designates a location on one of the layers of the optical disk.

10. The method of claim 6, wherein the optical disk comprises a DVD disk.

11. The method of claim 6, wherein both of the first and second indications are retrieved from the table of contents.

12. An article comprising a storage medium readable by a processor-based system, the storage medium storing instructions to cause a processor to:

designate a first region on an optical disk to store first data associated with a first compression technique;

designate a second region different from the first region on the optical disk to store second data associated with a second compression technique, the first compression technique being different from the second compression technique;

store the first data in the first region;

store the second data in the second region; and store indications of the first and second regions in a table of contents stored on the optical disk.

13. The article of claim 12, wherein the optical disk comprises a DVD disk.

14. The article of claim 12, comprising instructions to cause the processor to: encode uncompressed data to produce the first data.

15. The article of claim 12, comprising instructions to cause the processor to: encode uncompressed data to produce the second data.

16. An article comprising a storage medium readable by a processor-based system, the storage medium storing instructions to cause a processor to:

retrieve a first indication from an optical disk designating a first region associated with a first compression technique;

retrieve a second indication from the optical disk designating a second region associated with a second compression technique and being different from the first region, the second compression technique being different from the first compression technique;

retrieve first data from the first region using the first compression technique; and retrieve second data from the second region using the second compression technique, wherein at least one of the first and second indications is retrieved from a table of contents stored on the optical disk.

17. The article of claim 16, wherein the optical disk comprises a DVD disk.

18. The article of claim 16, wherein both of the first and second indications are retrieved from the table of contents.

19. A computer system comprising:

an optical disk drive adapted to receive an optical disk; and a processor coupled to the optical disk drive and adapted to:

designate a first region on the optical disk to store first data associated with a first compression technique;

designate a second region different from the first region on the optical disk to store second data associated with a second compression technique, the first compression technique being different from the second compression technique;

store the first data in the first region;

store the second data in the second region; and store indications of the first and second regions in a table of contents stored on the optical disk.

20. The computer system of claim 19, wherein the optical disk drive comprises a DVD disk drive.

21. A computer system comprising:

an optical disk drive adapted to receive an optical disk; and a processor coupled to the optical disk drive and adapted to:

retrieve a first indication from the optical disk designating a first region associated with a first compression technique;

retrieve a second indication from the optical disk designating a second region associated with a second compression technique and being different from the first region, the second compression technique being different from the first compression technique;

retrieve first data from the first region using the first compression technique; and retrieve second data from the second region using the second compression technique, wherein at least one of the first and second indications is retrieved from a table of contents stored on the optical disk.

22. The computer system of claim 21, wherein the optical disk drive comprises a DVD disk drive.

23. The computer system of claim 21, wherein both of the first and second indications are retrieved from the table of contents.

24. An article comprising an optical disk storing:

first data in a first region of the optical disk, the first data being associated with a first compression technique;

second data in a second region of the optical disk, the second region being different from the first region and the second data being associated with a second compression technique different from the first compression technique;

a first indication of the first compression technique; and a second indication of the second compression technique, wherein the first and second indications are stored in a table of contents.

25. The article of claim 24, wherein the optical disk has multiple layers, and the optical disk stores a third indication of a location of the first region on one of the layers of the optical disk.

26. The article of claim 25, wherein the third location is stored in the table of contents.

27. The article of claim 25, wherein the optical disk stores a fourth indication of a location of the second region on one of the layers of the optical disk.

28. The article of claim 25, wherein the fourth location is stored in the table of contents.

29. An optical disk adapted to be coupled to an optical disk drive and usable in association with a processor coupled to the optical disk drive, said optical disk causing the processor to:
- designate a first region on an optical disk to store first data associated with a first compression technique;
- designate a second region different from the first region on the optical disk to store second data associated with a second compression technique, the first compression technique being different from the second compression technique;
- store the first data in the first region;
- store the second data in the second region; and
- store indications of the first and second regions in a table of contents stored on the optical disk.

30. The optical disk of claim 29, wherein the optical disk comprises a DVD disk.

31. An optical disk adapted to be coupled to an optical disk drive and usable in association with a processor coupled to the optical disk drive, said optical disk causing the processor to:
- retrieve a first indication from an optical disk designating a first region associated with a first compression technique;
- retrieve a second indication from the optical disk designating a second region associated with a second compression technique and being different from the first region, the second compression technique being different from the first compression technique;
- retrieve first data from the first region using the first compression technique; and
- retrieve second data from the second region using the second compression technique, wherein the first and second indications are retrieved from a table of contents stored on the optical disk.

32. The optical disk of claim 31, wherein the optical disk comprises a DVD disk.

33. A method usable with an optical disk, comprising:
- designating a first region on the optical disk to store first data associated with a first compression technique;
- designating a second region different from the first region on the optical disk to store second data associated with a second compression technique, the first compression technique being different from the second compression technique;
- storing the first data in the first region;
- storing the second data in the second region; and
- storing indications of the first and second regions in a control data region of the optical disk.

34. The method of claim 33, further comprising:
- storing information on said optical disk indicating the first and second compression techniques.

35. The method of claim 33, wherein
- the optical disk has multiple layers, and
- the designating the first region comprises designating a location on one of the layers of the optical disk.

36. The method of claim 33, wherein
- the optical disk has multiple layers, and
- the designating the second region comprises designating a location on one of the layers of the optical disk.

37. The method of claim 33, wherein the optical disk comprises a DVD disk.

38. A method usable with an optical disk, comprising:
- retrieving a first indication from the optical disk designating a first region associated with a first compression technique;
- retrieving a second indication from the optical disk designating a second region associated with a second compression technique and being different from the first region, the second compression technique being different from the first compression technique;
- retrieving first data from the first region using the first compression technique; and
- retrieving second data from the second region using the second compression technique,
- wherein the first and second indications are retrieved from a control data region of the optical disk.

39. The method of claim 38, further comprising:
- retrieving information from said optical disk describing the first and second compression techniques.

40. The method of claim 38, wherein
- the optical disk has multiple layers, and
- the first indication designates a location on one of the layers of the optical disk.

41. The method of claim 38, wherein
- the optical disk has multiple layers, and
- the second indication designates a location on one of the layers of the optical disk.

42. The method of claim 38, wherein the optical disk comprises a DVD disk.

43. An article comprising a storage medium readable by a processor-based system, the storage medium storing instructions to cause a processor to:
- designate a first region on an optical disk to store first data associated with a first compression technique;
- designate a second region different from the first region on the optical disk to store second data associated with a second compression technique, the first compression technique being different from the second compression technique;
- store the first data in the first region;
- store the second data in the second region; and
- store indications of the first and second regions in a control data region of the optical disk.

44. The article of claim 43, wherein the optical disk comprises a DVD disk.

45. The article of claim 43, comprising instructions to cause the processor to: encode uncompressed data to produce the first data.

46. The article of claim 43, comprising instructions to cause the processor to: encode uncompressed data to produce the second data.

47. An article comprising a storage medium readable by a processor-based system, the storage medium storing instructions to cause a processor to:
- retrieve a first indication from an optical disk designating a first region associated with a first compression technique;
- retrieve a second indication from the optical disk designating a second region associated with a second compression technique and being different from the first region, the second compression technique being different from the first compression technique;
- retrieve first data from the first region using the first compression technique; and
- retrieve second data from the second region using the second compression technique, wherein the first and second indications are retrieved from a control data region of the optical disk.

48. The article of claim 47, wherein the optical disk comprises a DVD disk.

49. A computer system comprising:
an optical disk drive adapted to receive an optical disk; and
a processor coupled to the optical disk drive and adapted to:
designate a first region on the optical disk to store first data associated with a first compression technique;
designate a second region different from the first region on the optical disk to store second data associated with a second compression technique, the first compression technique being different from the second compression technique;
store the first data in the first region;
store the second data in the second region; and
store indications of the first and second regions in a control data region of the optical disk.

50. The computer system of claim 49, wherein the optical disk comprises a DVD disk.

51. A computer system comprising:
an optical disk drive adapted to receive an optical disk; and
a processor coupled to the optical disk drive and adapted to:
retrieve a first indication from the optical disk designating a first region associated with a first compression technique;
retrieve a second indication from the optical disk designating a second region associated with a second compression technique and being different from the first region, the second compression technique being different from the first compression technique;
retrieve first data from the first region using the first compression technique; and
retrieve second data from the second region using the second compression technique,
wherein the first and second indications are retrieved from a control data region of the optical disk.

52. The computer system of claim 51 the optical disk drive comprises a DVD disk drive.

53. An article comprising an optical disk storing:
first data in a first region of the optical disk, the first data being associated with a first compression technique;
second data in a second region of the optical disk, the second region being different from the first region and the second data being associated with a second compression technique different from the first compression technique;
a first indication of the first compression technique; and
a second indication of the second compression technique, wherein the first and second indications are stored in a control data region of the optical disk.

54. The article of claim 53, wherein
the optical disk has multiple layers, and
the optical disk stores a third indication of a location of the first region on one of the layers of the optical disk.

55. The article of claim 54, wherein the third location is stored in the control data region.

56. The article of claim 54 wherein the optical disk stores a fourth indication of a location of the second region on one of the layers of the optical disk.

57. The article of claim 56, wherein the fourth location is stored in the control data region.

58. An optical disk adapted to be coupled to an optical disk drive and usable in association with a processor coupled to the optical disk drive, said optical disk causing the processor to:
designate a first region on an optical disk to store first data associated with a first compression technique;
designate a second region different from the first region on the optical disk to store second data associated with a second compression technique, the first compression technique being different from the second compression technique;
store the first data in the first region;
store the second data in the second region; and
store indications of the first and second regions in a control data region of the optical disk.

59. The optical disk of claim 58, wherein the optical disk comprises a DVD disk.

60. An optical disk adapted to be coupled to an optical disk drive and usable in association with a processor coupled to the optical disk drive, said optical disk causing the processor to:
retrieve a first indication from an optical disk designating a first region associated with a first compression technique;
retrieve a second indication from the optical disk designating a second region associated with a second compression technique and being different from the first region, the second compression technique being different from the first compression technique;
retrieve first data from the first region using the first compression technique; and
retrieve second data from the second region using the second compression technique, wherein at least one of the first and second indications is retrieved from a control data region of the optical disk.

61. The optical disk of claim 60, wherein the optical disk comprises a DVD disk.

* * * * *

UNITED STATES PATENT AND TRADEMARK OFFICE
CERTIFICATE OF CORRECTION

PATENT NO. : 6,339,568 B1
DATED : January 15, 2002
INVENTOR(S) : Yasuo Kamatani

It is certified that error appears in the above-identified patent and that said Letters Patent is hereby corrected as shown below:

<u>Column 4,</u>
Line 66, "region" should be -- region, the --

<u>Column 5,</u>
Line 4, "technique" should be -- technique, --

<u>Column 9,</u>
Line 43, "51" should be -- 51, wherein --.

Signed and Sealed this

Fourth Day of June, 2002

Attest:

JAMES E. ROGAN
Attesting Officer          Director of the United States Patent and Trademark Office